(12) United States Patent
Ruffa

(10) Patent No.: US 8,331,194 B1
(45) Date of Patent: Dec. 11, 2012

(54) UNDERWATER ACOUSTIC WAVEGUIDE

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 268 days.

(21) Appl. No.: 12/767,072

(22) Filed: Apr. 26, 2010

(51) Int. Cl.
  *H04B 11/00* (2006.01)
(52) U.S. Cl. ......................................................... 367/134
(58) Field of Classification Search .................... 367/134
  See application file for complete search history.

(56) References Cited

U.S. PATENT DOCUMENTS

| | | | | |
|---|---|---|---|---|
| 3,177,466 A | * | 4/1965 | Arnoldi | 367/135 |
| 3,896,898 A | * | 7/1975 | Kirby et al. | 181/120 |
| 4,945,520 A | * | 7/1990 | Ford | 367/191 |
| 5,999,491 A | * | 12/1999 | Harvey et al. | 367/144 |
| 6,045,777 A | * | 4/2000 | Church et al. | 424/9.52 |
| 7,126,875 B2 | * | 10/2006 | Baskerville et al. | 367/24 |
| 2002/0035416 A1 | * | 3/2002 | De Leon | 701/14 |
| 2003/0058738 A1 | * | 3/2003 | Erikson | 367/7 |
| 2006/0054205 A1 | * | 3/2006 | Yabe et al. | 134/184 |
| 2007/0022937 A1 | * | 2/2007 | Wallace | 114/333 |
| 2007/0046398 A1 | * | 3/2007 | Nguyen et al. | 333/186 |
| 2008/0006197 A1 | * | 1/2008 | Lambertus et al. | 114/313 |
| 2008/0081324 A1 | * | 4/2008 | Eckert | 435/1.1 |
| 2008/0206362 A1 | * | 8/2008 | Yamasaki et al. | 424/699 |
| 2009/0188672 A1 | * | 7/2009 | Norris et al. | 166/369 |
| 2010/0124142 A1 | * | 5/2010 | Laugharn et al. | 366/108 |
| 2010/0280773 A1 | * | 11/2010 | Saether | 702/58 |

OTHER PUBLICATIONS

Roland Steitz, Thomas Gutberlet, Thomas Hauss, Beate Klösgen, Rumen Krastev, Sebastian Schemmel, Adam C. Simonsen, and Gerhard H. Findenegg "Nanobubbles and Their Precursor Layer at the Interface of Water Against a Hydrophobic Substrate" Langmuir, 2003, 19 (6), pp. 2409-2418.*

Kenji Kikuchia, Yoshinori Tanakab, Yasuhiro Saiharab, Zempachi Ogumic., "Study of hydrogen nanobubbles in solution in the vicinity of a platinum wire electrode using double-potential step chronoamperometry". Electrochimica Acta. vol. 52, Issue 3, Nov. 12, 2006, pp. 904-913.*

* cited by examiner

*Primary Examiner* — Isam Alsomiri
*Assistant Examiner* — James Hulka
(74) *Attorney, Agent, or Firm* — James M. Kasischke; Michael P. Stanley; Jean-Paul A. Nasser

(57) ABSTRACT

A system and method for generating an underwater acoustic waveguide suitable for guiding acoustic energy between a source and a receiver to enable underwater communications. Electrolysis of water by electrically powered terminals continuously creates a bubble field having a volume fraction of less than 0.01% gas. The bubble field has a lower sound speed than the surrounding water, resulting in the bubble field acting as a waveguide to transmit sound over the length of the bubble field. By maintaining small bubble radii, the bubble field can be stable for long periods of time. By keeping the volume fraction and bubble radii small, the power requirements for the terminals are minimized.

1 Claim, 2 Drawing Sheets

UNDERWATER ACOUSTIC WAVEGUIDE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

Not applicable.

BACKGROUND OF THE INVENTION (1) Field of the Invention

The present invention relates to underwater communication and more particularly to a system and method for generating an underwater acoustic waveguide to guide acoustic energy between a source and a receiver.

(2) Description of the Prior Art

It is known in the art that the attenuation of acoustic energy in water presents problems in long distance underwater communications. While very low frequency acoustic energy can be propagated over long distances, the underwater environment is "noisy" in these bands.

At higher frequencies, the attenuation is such that high power is needed to generate sufficiently strong acoustic energy needed for communication. For example, spherical spreading losses lead to approximately 66 decibel (dB) attenuation at a range of approximately 2000 meters.

It is also known in the art that acoustic energy confined to a waveguide can travel over large distances without spherical spreading losses.

What are therefore needed are a system and method for generating an underwater waveguide such that acoustic energy can be transmitted through the waveguide over long distances. Accordingly, the waveguide needs to be stable over time and needs to extend over long distances to provide underwater communication between widely separated platforms. For efficiency, the power requirements for generating the waveguide need to be minimized.

SUMMARY OF THE INVENTION

It is therefore a general purpose and primary object of the present invention to provide systems and methods for generating an underwater acoustic waveguide suitable for guiding acoustic energy between a source and a receiver while suppressing acoustic energy propagation in directions other than that of the waveguide so as to enable secure underwater communications.

In the invention, electrically powered terminals continuously create a bubble field by electrolysis. The speed of sound is reduced within the bubble field. As an example, a volume fraction of 0.03% gas reduces the sound speed of the mixture by a factor of two. It is known that sound bends continuously towards a region of slower speed. Since the bubble field has a lower sound speed than the surrounding water, refraction tends to keep the sound within the field. Thus, as the bubble field transits through the water, the bubble field acts as a waveguide to transmit sound over the length of the bubble field.

By keeping the volume fraction small, the power requirements for the terminals are minimized. In addition, generating bubbles via electrolysis permits good control over the bubble radii. By maintaining small bubble radii, the bubble field can be stable for long periods of time.

For example, a bubble in water having a radius of 0.1 millimeter (mm) will rise at a terminal velocity of 20 mm/second (mm/s), while a bubble radius of 0.03 mm leads to a terminal velocity of 2 mm/s. At a velocity of 2 mm/s, the bubble field rises only 7 meters (m) per hour.

In one embodiment, a system for underwater communication includes an underwater communication platform, a second communication platform, and a bubble field extending between the platforms. In one embodiment, the bubble field has a volume fraction of less than 0.03% gas. In another embodiment, the bubble field has a volume fraction of less than 0.01% gas. In yet another embodiment, the system includes an acoustic transceiver at each of the platforms. The transceivers transmit and receive acoustic signals within the bubble field.

In one embodiment, the system includes a bubble field generator aboard the underwater vehicle. The bubble generator can include a power source and two terminals connected respectively to a positive and a negative portion of the power source. The terminals are immersed in water and electrolysis of the water forms bubbles at the terminals.

Radii of the bubbles can be controlled to limit a terminal velocity of the bubbles rising in water. A length of the bubble field is dependent on the depth at which the bubble field is generated, the terminal velocity of the bubbles, and the speed at which the underwater platform transits through the water. The spacing between the terminals corresponds to a quarter wavelength of the acoustic signals transmitted within the bubble field.

In one embodiment, an underwater communication system includes an underwater communication platform, a second communication platform, an electrolyzer aboard the underwater platform, and a bubble field generated by the electrolyzer and extending between the underwater communication platform and the second communication platform. The system can allow movement of the second communication platform to maintain the bubble field connection between the communication platforms.

In one embodiment, the bubbles forming the bubble field have an average radius of less than 0.1 millimeters. In another embodiment, the bubbles have an average radius of less than 0.05 millimeters.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DETAILED DESCRIPTION OF THE INVENTION

Figure 1:
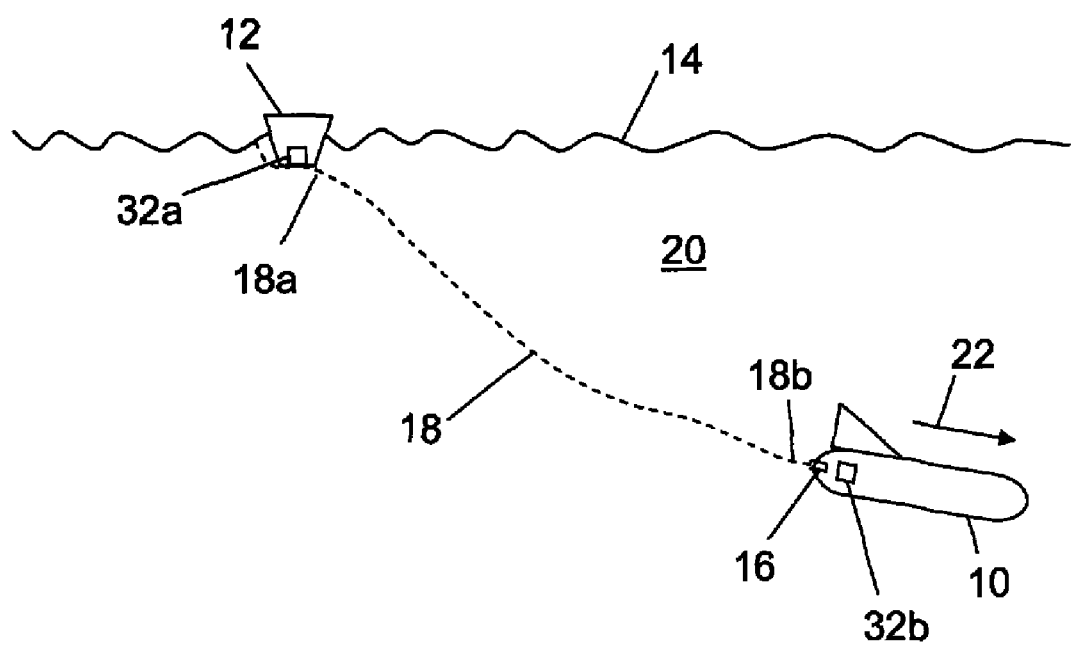
FIG. 1 depicts a schematic of the generation and use of an underwater waveguide.

Referring to FIG. 1, there is shown a schematic of an underwater vehicle (UV) 10 in communication with a platform 12. For illustration, but not limitation, the platform 12 is shown at a water surface 14. A generator 16 aboard the UV 10 generates a bubble field 18 as the UV transits through water 20 in the direction of arrow 22.

For communication between the UV 10 and the platform 12, the bubble field 18 extends between the UV and the platform. As the UV 10 generates the bubble field 18, the bubble field rises towards the surface 14. Accordingly, a trailing end 18*a* of the bubble field 18, furthest from the UV 10, is closer to the surface 14 than a forward end 18*b*, nearest to the UV.

Figure 2:
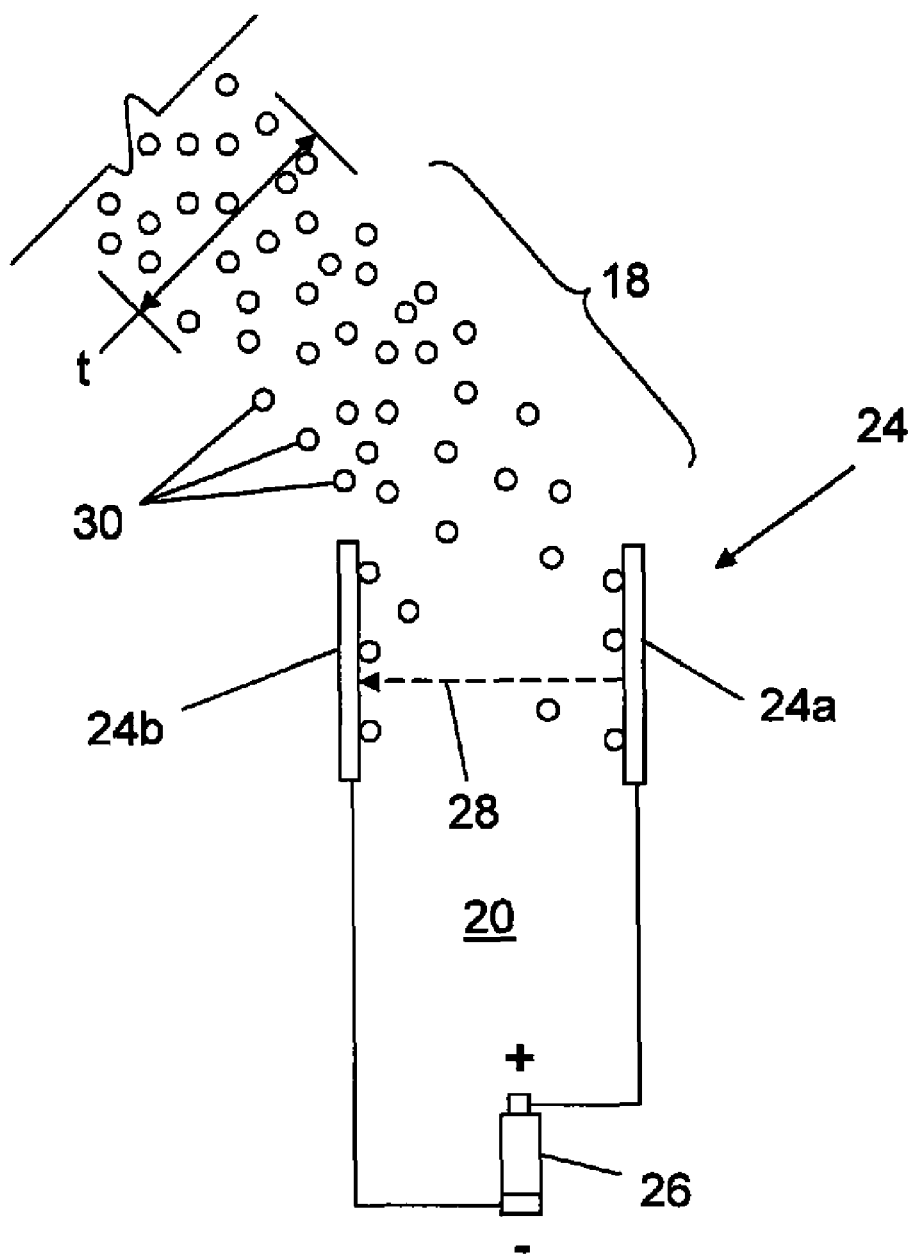
FIG. 2 depicts a schematic of the forming of a bubble field via electrolysis.

Referring to FIG. 2, there is shown the bubble field 18 being generated via electrolysis of the water 20. An electrolyzer 24 includes two terminals 24*a* and 24*b*. The terminals 24*a* and 24*b* are immersed in the water 20 and connected to a power source 26 such that the terminal 24*a* is positive and the terminal 24*b* is negative. The power source 26 generates a current (illustrated by a dotted arrow 28) that passes between the terminals 24*a* and 24*b*. As is known in the art, the current 28 causes the water 20 to split into constituent hydrogen and oxygen gasses (designated as bubbles 30) that as a group form the bubble field 18. For clarity of illustration, only three of the bubbles 30 have been so designated.

As previously discussed, a bubble field with a bubble fraction of 0.03% gas has a lower sound speed than the surrounding water. To ensure a suitable waveguide, the volume fraction for the bubble field 18 can be less than 0.01% gas. Accordingly, refraction will tend to keep sound within the bubble field 18. Hence, the bubble field 18 acts as a waveguide and spherical spreading losses are minimized. The bubble field 18, (as a waveguide 18) confines most of the acoustic energy thereby enabling secure underwater communications with low-power sources.

Typical acoustic waveguides have transverse dimensions on the order of a quarter wavelength. Accordingly, spacing between the terminals 24*a* and 24*b* can be such that the transverse dimension (t in FIG. 2) of the bubble field 18 corresponds to a quarter wavelength of the acoustic energy to be transmitted therethrough.

The length of the bubble field 18 is limited by the depth at which the bubble field is generated, by the terminal velocity of the individual bubbles 30 that make up the bubble field, and by the speed at which the UV 10 moves through the water 20. Stokes' Law governs the bubble terminal velocity:

$$V = \frac{2(\rho_a - \rho_w)gr^2}{9\mu}, \quad \text{where} \qquad [1]$$

V is the terminal velocity;
$\rho_a$ and $\rho_w$ are the gas and water densities, respectively;
g is the gravitational acceleration;
r is the individual bubble radius; and
$\mu$ is the dynamic viscosity of the water.

The bubble field 18 can be stable for long periods of time (on the order of hours) when the terminal velocity, V, is low. As an example, a bubble having a radius of 0.1 mm will rise in the water 20 at a terminal velocity of 20 mm/s and a bubble with a radius of 0.03 mm has a terminal velocity of 2 mm/s, rising only 7 m per hour. Considering, as an example, a depth of 10 m for the UV 10, it will take on the order of one and one half hours for a bubble of radius 0.03 mm to rise from the UV 10 to the surface 14. For an exemplary speed of 5 kilometers (km) per hour for the UV 10, the bubble field 18 will have a length of over 7 km.

Thus, an underwater vehicle with a power source and an electrical grid (such as the UV 10 with power source 26 and terminals 24*a* and 24*b*) can continuously create a bubble field waveguide (such as the bubble field 18) by electrolysis as the underwater vehicle transits through the water 20. By the underwater vehicle initiating the waveguide such that the waveguide intersects with a communications platform (such as the platform 12), the waveguide can enable a communications path between the platform and the underwater vehicle.

As the waveguide minimizes spherical spreading losses, low power acoustic transceivers at the platform and the underwater vehicle (such as transceivers 32*a* and 32*b* in FIG. 1) can maintain long-range communications through the waveguide. The low bubble volume fraction (less than about 0.01%) minimizes the power needed to generate the bubbles via electrolysis. The small radii of the bubbles required for a lengthy and stable waveguide (e.g., radii of about 0.03 mm for a 7 km waveguide) also minimize the power requirements for electrolysis. Additionally, the radii of the bubbles 30 can be optimized to obtain the desired length and duration for the bubble field 18, based on Equation [1].

What have thus been described are systems and methods for long range, secure, underwater communications. A bubble field is generated by an underwater vehicle via electrolysis. The bubble field extends between the underwater vehicle and a communications platform. The bubble field has a volume fraction of less than 0.01% gas such that acoustic energy is refracted within the bubble field.

As a result of the refraction within the bubble field, acoustic energy losses from the bubble field are minimized. Thus, the bubble field serves as a secure waveguide for the transmission of acoustic signals. In addition, the radii of the bubbles making up the bubble field are controlled such that the terminal velocity of the bubbles rising within the water is optimized for the desired length and duration of the waveguide.

Obviously many modifications and variations of the present invention may become apparent in light of the above teachings. For example, to maintain communication over longer periods, the platform 12 can move about the surface 14 to remain in connection with the bubble field 18. Additionally, the platform 12 need not be a surface platform. The platform 12 may be another underwater vehicle that intercepts the bubble field 18 to initiate communication with the UV 10.

While electrolysis provides a preferred means for generating the bubble field 18 due to both the low power requirements and the control over bubble radii, other means can also be employed. As examples, but not for limitation, chemical interactions (e.g., sodium bicarbonate and water) or discharging compressed gas through a perforated plate can also generate suitable bubble fields.

In light of the above, it is therefore understood that within the scope of the appended claims, the invention may be practiced otherwise than as specifically described.

What is claimed is:

1. A system for underwater communication, said system comprising:
   an underwater communication platform capable of controllable movement, said underwater communication platform including a bubble field generator;
   a second communication platform capable of controllable movement;
   a bubble field extending between said underwater communication platform and said second communication platform with a forward end of said bubble field closest to said underwater communication platform and a trailing end of said bubble field closest to said second communication platform wherein said bubble field has a volume fraction of less than 0.03% gas;
   a power source;
   two terminals connected respectively to a positive and a negative portion of said power source, said terminals capable of being immersed in water and with said terminals capable of electrolysis of water forming bubbles at said terminals wherein a spacing between said terminals corresponds to a quarter wavelength of the acoustic signals transmitted within said bubble field; and two acoustic transceivers with one transceiver at said underwater platform and another transceiver at said second platform, each of said transceivers capable of transmitting and receiving acoustic signals within said bubble field.

\* \* \* \* \*